United States Patent [19]

Dolenti

[11] Patent Number: 4,466,506
[45] Date of Patent: Aug. 21, 1984

[54] WIRE LIFT DEVICE FOR HIGH TENSION ELECTRIC LINE

[76] Inventor: Alfred N. Dolenti, 192 Limerick Center Rd., Royersford, Pa. 19468

[21] Appl. No.: 339,661

[22] Filed: Jan. 15, 1982

[51] Int. Cl.$^3$ ............................................. B66F 11/04
[52] U.S. Cl. .................................... 182/2; 254/133 R
[58] Field of Search .......................... 182/2, 129, 204; 414/11, 10; 254/4 R, 4 C, 47, 133, 134.3 PA; 269/43, 70, 17, 58

[56] References Cited

U.S. PATENT DOCUMENTS

| | | | |
|---|---|---|---|
| 1,864,934 | 6/1932 | Reeves | 182/2 |
| 2,936,849 | 5/1960 | Larson | 182/204 |
| 2,969,849 | 1/1961 | Grant | 182/2 |
| 3,146,853 | 9/1964 | Eckels | 182/2 |
| 3,490,558 | 1/1970 | Foley | 182/129 |
| 3,788,424 | 1/1974 | Chabot | 182/129 |

*Primary Examiner*—Reinaldo P. Machado
*Assistant Examiner*—Alvin Chin-Shue
*Attorney, Agent, or Firm*—Paul & Paul

[57] ABSTRACT

For use in energized high voltage pole line maintenance work, a vertical mast carrying a temporary crossarm is adjustably attached to an adapter sleeve mounted in lieu of one of the buckets of a dual-bucket truck on the self-leveling cross shaft, so that the axis of the sleeve is always vertically disposed. The mast is slidingly received and movable lengthwise within the adapter sleeve. The lineman in the bucket first maneuvers the boom carrying the bucket and the temporary crossarm to a desired position usually adjacent to the pole, under the high voltage line conductor(s). He then, by power means, raises the mast carrying the temporary crossarm, thereby lifting the conductor(s) above the pole top. In so lifting the mast, each of the line conductors drops into a receiving bracket on the temporary crossarm and is automatically locked therein. A quick disconnect for releasing the crossarm from the mast is provided controlled by a lineman on the ground. In a modified form, the mast-carrying sleeve may be mounted on the end of a jib arm extending forwardly from the boom of a bucket truck.

3 Claims, 5 Drawing Figures

WIRE LIFT DEVICE FOR HIGH TENSION ELECTRIC LINE

BACKGROUND OF THE INVENTION

The present invention relates to maintenance work on live high-tension (up to 34- kv) electric power pole lines.

It frequently happens that a particular pole in a live three-phase power line must be converted to a terminal pole in order, for example, to feed a new industrial plant. In such case, the high tension line must be tapped at the top of a line pole. In such situation, it is desirable to do the work without interrupting the power in the line, since power interruptions cost the utility company loss of revenue. Moreover, service interruptions make customers unhappy.

Another example of a situation requiring clearing of the area at the top of the pole is where an insulator has cracked and requires replacement. In such case, the live high-tension wires must be disconnected from the crossarm and lifted by some means above the pole top to make room for the lineman to work without coming into physical contact with the live high-tension wires.

Heretofore, the live high-tension wires have been lifted by a temporary crossarm which is attached to a three-arm lifting tree. Such a tree has a central arm and on each side thereof a side arm. The side arms are connected to the central arm at the lower end but diverge outwardly at their upper ends. The central arm of the lifting tree is attached to the pole by several spaced-apart braces and, to lift the tree to raise the live conductors, the braces must be moved upwardly on the pole. Assembly of such a lifting tree, attaching it to the pole, shifting it and its braces upwardly as the tree is raised to lift the live conductors, requires several linemen and several hours of work.

SUMMARY OF THE INVENTION

The object of the present invention is to provide an improved lifting device for lifting live high-tension wires above a pole top to provide clearance for a lineman to work in that area.

Another object is to provide lifting means which are attached, not to the pole, but to the boom of a lineman's bucket truck, for fast safe lifting of the conductors of a live three-phase high-tension power line.

DETAILED DESCRIPTION OF THE PREFERRED EMBODIMENTS

Figure 1:
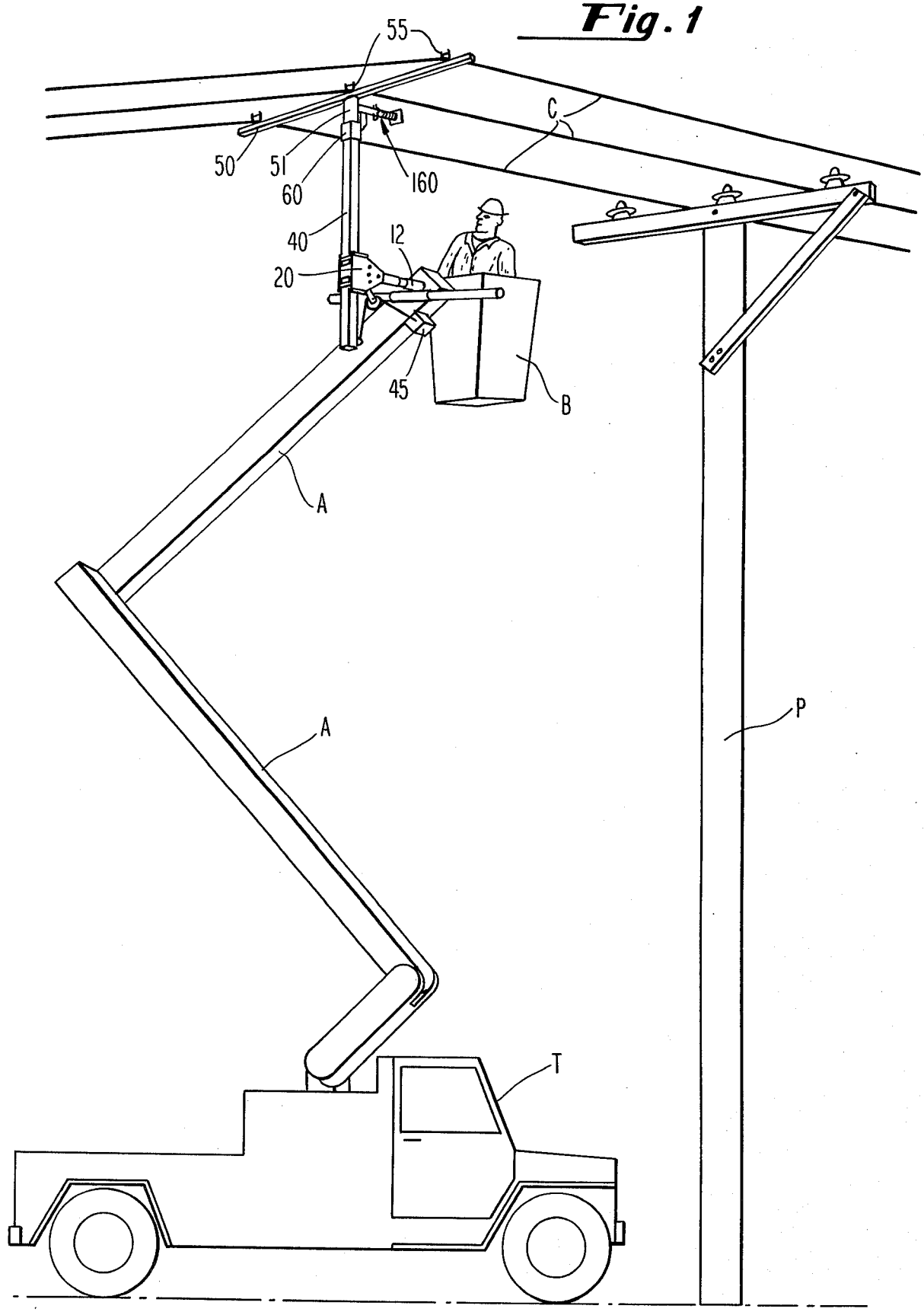
FIG. 1 is a perspective view illustrating a preferred embodiment of a lifting device according to the present invention.
Figure 2:
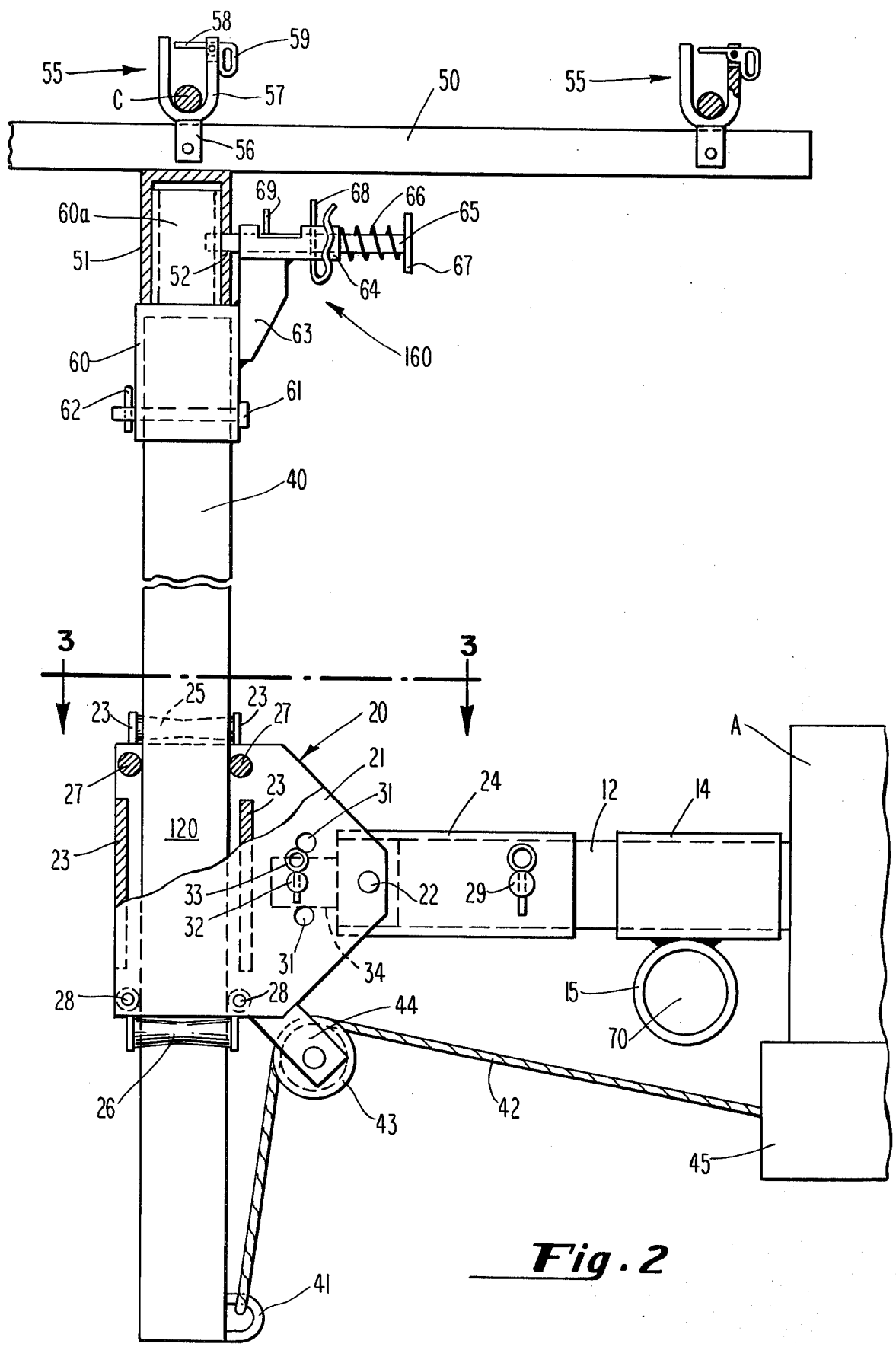
FIG. 2 is a detailed elevational view of the new device.

Referring first to FIGS. 1 and 2, a line truck T having an articulated boom arm A is illustrated. One of the buckets B of the dual-bucket truck has been removed from the self-leveling shaft 12 and in its place an adapter 20 has been mounted. Adapter 20 includes a sleeve 120 (FIG. 2) of square cross-section into which an elongated square cross-section mast 40 is inserted. Secured to the lower end of the mast 40 is a hook 41 to which a cable 42 is tied. Cable 42 passes over a pulley 43 supported by bracket 44 from the adapter 20. Cable 42 leads to a power winch 45 mounted on the boom arm A of the truck. It will be seen that by means of the cable 42 and winch 45 the mast 40 may be raised and lowered.

Figure 3:
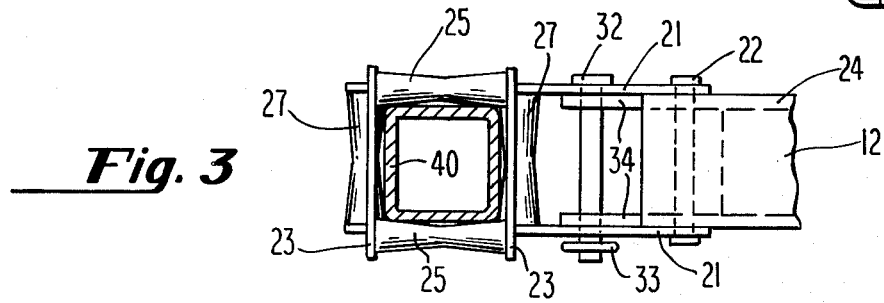
FIG. 3 is a view looking down along the line 3—3 of FIG. 2.

Referring now to FIGS. 2 and 3, adapter 20 is formed by a pair of spaced-apart parallel plates 21 and a second pair of spaced-apart parallel plates 23 disposed at right angles to the plates 21. Supported in plates 21 are a pair of upper rollers 25 and a pair of lower rollers 26. Similarly, supported in plates 23 are a pair of upper rollers 27 and a pair of lower rollers 28. The spacing between the rollers of each pair correspond to the cross dimension of the square mast 40, as is illustrated in FIG. 3. Thus, when mast 40 is inserted into the sleeve 120, the side surfaces of the mast 40 are engaged by the pairs of rollers 25,26,27,28.

Projecting laterally from the nose portion of the plates 21 is a sleeve 24 of circular cross section which is secured pivotally to the nose portion of the plates 21 by the pivot pin 22. Extending inwardly from the inward end of sleeve 24 is a projection 34 having a hole therethrough which receives a cross pin 32 and a lock pin 33. Three holes 31 are provided in the plates 21 so that the position of sleeve 24 relative to adapter may be adjusted angularly, according to which of the holes 31 the pin 32 is inserted into.

Sleeve 24 is adapted to fit over the end of the self-leveling cross shaft 12. Shaft 12 is a component part of the boom truck T on which both buckets are ordinarily mounted, one on each side of the boom arm A. Sleeve 24 is secured to shaft 12 by cross pin 29. Also mounted on shaft 12, as a standard part of the bucket truck, is a circular sleeve 14 having welded thereto a sleeve 15 of circular cross section which is disposed at right angles to sleeve 14 and shaft 12. Sleeve 15 supports a jib arm 70 which is a standard part of the bucket truck equipment.

Mounted at the top of mast 40 is a temporary crossarm 50 which is shown to be equipped with three receptacles 55 for receiving and capturing the three live high-tension conductors C of the three-phase line. Secured to and depending from crossarm 50 is a sleeve 51 of square cross section having a hole 52 in one of its side walls.

Fitted over the upper end of mast 40 is a collar 60 of square cross-section. Collar 60 is connected to mast 40 by a cross pin 61. Projecting upwardly from collar 60 is a section 60a of square cross-section but of reduced dimension relative to collar 60. In the sidewall of section 60a is hole adapted to register with hole 52 of sleeve 51 of crossarm 50.

Also extending upwardly from collar 60, at one side thereof, is a bracket 63 having at its upper end a horizontal sleeve 64 which receives a bolt 65. Bolt 65 is spring loaded outwardly by compression spring 66 which is positioned between the outward end of sleeve 64 and the head 67 of the bolt 65. The straight leg of a hair pin 68 is inserted through registered cross holes in sleeve 64 and bolt 65 to maintain bolt 65 in its inward or connected position wherein the innermost end of bolt 65 projects inwardly through the registered holes in sleeve 51 and section 60a of collar 60.

As previously indicated, the temporary crossarm 50 is provided with three receptacles 55 spaced apart by spacing corresponding to the spacing between the individual conductors C of the high tension three-phase line. As seen in FIG. 2, each of the receptacles 55 comprises a generally U-shaped member 57 having at its upper open end a gate 58 mounted for pivotal movement on the upper end of one of the legs of the U-shaped member 57. Gate 58 is normally held in closed position shown in FIG. 2 by the counter-weight-and-stop portion 59. When the mast 40 is raised by the bucket operator to raise the temporary crossarm 50 up to the three-phase overhead line, gate 58 of each receptacle 55 comes into engagement with one of the conductors C of the three-phase line. As upward movement of mast 40 continues, the gate 58 is moved pivotally downwardly by the conductor C, thereby allowing the conductor to enter into the notch of the U-member 55. Then, as the conductor clears the gate, the gate 58 snaps back into its closed position, as shown in FIG. 2, thereby capturing the conductor C within the receptacle 55. To remove the temporary crossarm 50 from the line conductors C, the lineman uses a hot stick having a hook end which he places into the hole of the counter-weight-and-stop 59 to raise 59 to open the gate 58.

It will be seen that when the high tension line conductors C are captive in the receptacles 55, the boom arm A of the truck cannot be lowered since the receptacles 55 are secured to the temporary crossarm 50, and the temporary crossarm 50 is connected to the mast 40 which in turn is connected by adapter 20 to the bucket shaft 12. Consequently, if the lineman in the bucket suddenly became ill or was otherwise incapacitated, as for example, rendered unconscious by a high-voltage shock from the high-tension line, or because he had suffered a heart attack, the bucket with the injured lineman could not be lowered to the ground unless some provision were made for disconnecting the boom arm A from the temporary crossarm 50. Such a quick disconnect is provided by the mechanism identified 160. This mechanism comprises the elements 63-69.

Figure 4:
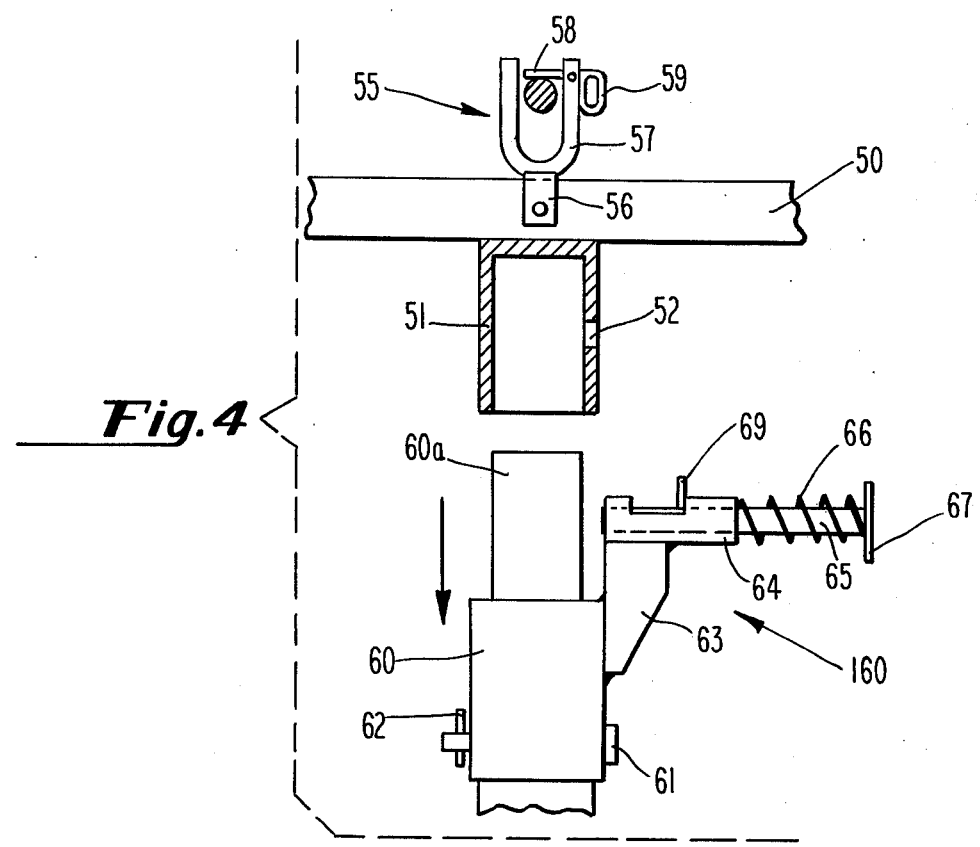
FIG. 4 is a view showing the quick disconnect mechanism in disconnected condition.

Tied to the hook portion of hair pin 68, but not shown in the drawing, is an insulating cord, preferably monofilament nylon, which extends about 3 feet and is connected to a ⅜ inch polypropylene rope extending all the way down to the ground. Thus, in the event of an emergency requiring immediate lowering of the lineman and bucket to the ground, a second lineman on the ground pulls on the nylon cord thereby pulling out the hair pin 68. This allows the spring-loaded bolt 65 to move quickly outwardly, whereby the inner ends of the bolt are pulled out from the registered holes in the crossarm sleeve 51 and in projection 60a of mast sleeve 60. This disconnects the mast 40 from the crossarm 50, as is illustrated in FIG. 4 and allows the boom arm A to be lowered. The temporary crossarm 50 remains above, hanging from the line wires, as illustrated in FIG. 4, and may be removed later. Reference numeral 69 identifies a retaining tab which, when the hair pin 68 is pulled out, prevents the bolt 65 from escaping from the sleeve 64 and falling to the ground.

Figure 5:
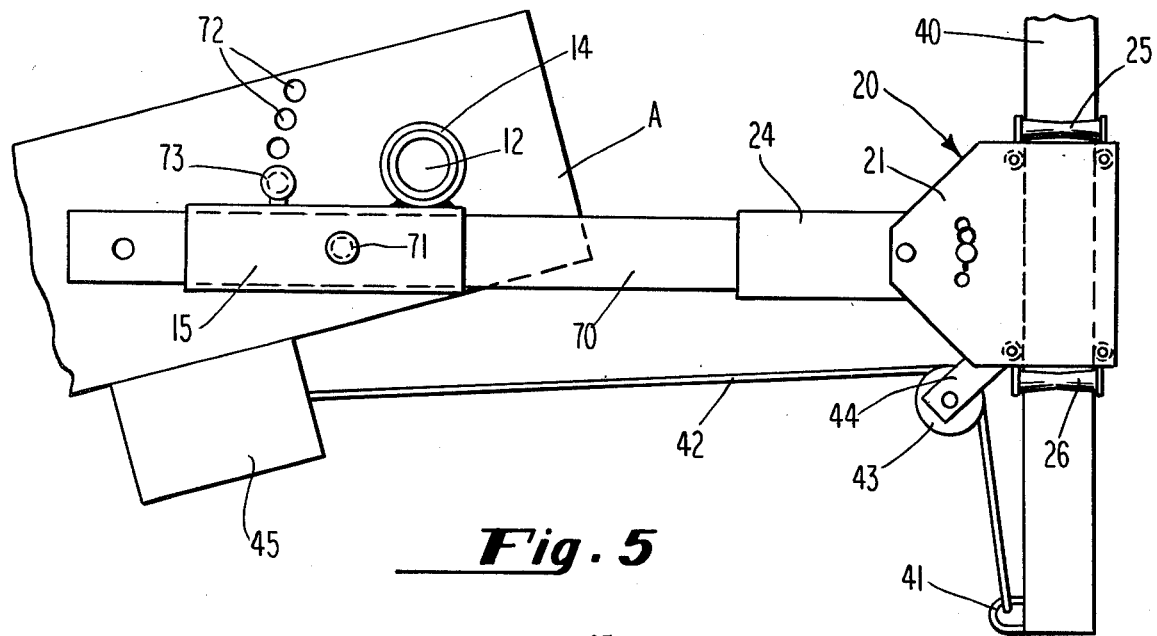
FIG. 5 is an illustration of a modification of the invention wherein the mast is attached to the end of the jib arm instead of to the self leveling shaft on which the buckets are mounted.

FIG. 5 illustrates an alternative way of attaching the adapter 20 to the boom arm A of the bucket truck. As mentioned previously, and as illustrated in FIG. 2, a jib arm 70 is a standard component of a dual bucket truck. It is attached to the boom arm by insertion into a sleeve 15 which is welded to sleeve 14 at right angles thereto. Sleeve 14 fits on the self-leveling shaft 12 which supports the dual buckets, one on each side of the boom arm.

In the alternative embodiment illustrated in FIG. 5, the circular cross-section sleeve 24 of adapter 20 is fitted over the inner end of the jib arm 70. The angular position of the jib arm 70 relative to the boom arm A is adjustable pivotally on pivot pin 71 by moving lock pin 73 into one of the other holes 72. Thus, the orientation of the mast 40 relative to the boom arm A is adjustable within the limits provided by the holes 72. The advantage of using the alternative method of attaching the adapter 20 and mast 40 to the boom arm, illustrated in FIG. 5 is that the lift device (mast 40 and crossarm 50) is further away from the bucket in which the lineman is riding and from which he is controlling the movement of the boom and the lifting device. This decreases the possibility of contact of the boom and bucket with a live high-tension wire. This will be advantageous in certain situations. The disadvantage of the alternative attachment illustrated in FIG. 5 is that the adapter 20 is not mounted on the self-leveling shaft 12 on which the buckets are mounted. The mechanism by which the bucket shaft 12 is made self-levelling is well known and is not illustrated or described in this application.

If a pole is broken off during a storm or as a result of a traffic mishap, and the top part of a pole remains dangling from the live conductors, the bucket truck is placed in mid-span at any desired distance from the damaged pole and the conductors are raised up out of the way by the lift device while the pole is replaced, without deenergizing the line. As far as is known, there is no way in the prior art to accomplish such pole replacement without deenergizing the line.

The lift device may also conveniently be used to temporarily lift out of the way energized conductors over-grown and entangled by tree branches, while the tree is trimmed.

What is claimed is:

1. A wire lifting device adapted for attachment to an electric lineman's boom truck intended for use in lifting simultaneously at least two energized high tension line wires above a work area for clearing the work area thereunder, said lifting device comprising:
    a. a jib arm attached to the boom and extending forwardingly thereof,
    b. a sleeve;
    c. means for mounting said sleeve on the forward end of said jib arm with the axis of said sleeve vertical relative to said jib arm;
    d. an elongated mast slidingly received within said sleeve;
    e. a temporary crossarm for temporarily supporting at least two energized high tension conductors in horizontal positions relative to each other;
    f. means connecting said temporary crossarm to the upper end of said mast; and
    g. power means for lifting said mast to cause said temporary crossarm to lift and support at least two energized high tension conductors above the work area.

2. A wire lifting device according to claim 1 wherein said boom truck has a cross-axis shaft on which at least one lineman's bucket is mounted and wherein said jib arm is pivotally attached on said cross-axis shaft.

3. A wire lifting device according to claim 2 wherein said jib arm is angularly adjustable with respect to said boom.

* * * * *